US008720032B2

(12) United States Patent
Van der Meijden et al.

(10) Patent No.: US 8,720,032 B2

(45) Date of Patent: May 13, 2014

(54) METHOD FOR INSTALLING THE HOISTING ROPING OF AN ELEVATOR

(75) Inventors: Gert Van der Meijden, Otterlo (NL); Jos Van den Heuvel, Nn's-Hertogenbosch (NL)

(73) Assignee: Kone Corporation, Helsinki (FI)

(*) Notice: Subject to any disclaimer, the term of this patent is extended or adjusted under 35 U.S.C. 154(b) by 146 days.

(21) Appl. No.: 13/293,887

(22) Filed: Nov. 10, 2011

(65) Prior Publication Data

US 2012/0055002 A1 Mar. 8, 2012

Related U.S. Application Data

(63) Continuation of application No. PCT/FI2010/000029, filed on May 3, 2010.

(30) Foreign Application Priority Data

May 28, 2009 (FI) ...................................... 20090213

(51) Int. Cl.
*B21D 39/03* (2006.01)
*B23P 11/00* (2006.01)

(52) U.S. Cl.
USPC .............................. 29/429; 187/414; 187/900

(58) Field of Classification Search
USPC .................... 29/429, 430, 431, 791; 254/105; 187/900, 414
See application file for complete search history.

(56) References Cited

U.S. PATENT DOCUMENTS 3,207,475 A 9/1965 Johansson et al.
3,522,931 A * 8/1970 Von Heidenstam ......... 254/89 R
3,851,736 A * 12/1974 Westlake et al. ............. 52/745.2
4,345,671 A * 8/1982 Tosato et al. ................. 52/745.2
5,230,404 A * 7/1993 Klein ............................ 187/414
6,672,013 B1 * 1/2004 Glassey et al. .................... 52/30
7,635,049 B2 * 12/2009 Van Der Meijden et al. . 187/401
8,186,130 B2 * 5/2012 Van Der Meijden et al. .......................... 52/745.17

(Continued)

FOREIGN PATENT DOCUMENTS

CN 1703367 A 11/2005
EP 1583710 10/2005

(Continued)

OTHER PUBLICATIONS

Chinese Search Report for corresponding Chinese Application No. 201080023136.4 dated May 13, 2013.

*Primary Examiner* — David Bryant
*Assistant Examiner* — Christopher M Koehler
(74) *Attorney, Agent, or Firm* — Harness, Dickey & Pierce, P.L.C.

(57) ABSTRACT

The object of the invention is a method for installing the hoisting roping of an elevator, in which method the hoisting roping of the elevator is lifted upwards into the elevator hoistway by means of a hoisting device. The hoisting roping is lifted upwards into the elevator hoistway in steps such that at least one rope of the roping is lifted by pulling it to the height and the aforementioned at least one rope is fixed to the elevator hoistway or to another fixed structure of the building, at least one of the ropes of the roping that is at the height and was lifted in phase is detached, at least one rope detached in phase is lifted by pulling it to the next height and the aforementioned at least one rope is fixed to the elevator hoistway or to another fixed structure of the building.

9 Claims, 3 Drawing Sheets

(56) References Cited

U.S. PATENT DOCUMENTS

| | | | | |
|---|---|---|---|---|
| 8,291,568 | B2 * | 10/2012 | Barneman | 29/429 |
| 2005/0023425 | A1 * | 2/2005 | Jackson | 248/304 |
| 2005/0150728 | A1 * | 7/2005 | Van Der Meijden et al. | 187/411 |
| 2009/0223751 | A1 * | 9/2009 | Peacock et al. | 187/414 |
| 2010/0133048 | A1 * | 6/2010 | Barneman | 187/414 |
| 2011/0113720 | A1 * | 5/2011 | Peacock et al. | 52/741.1 |

FOREIGN PATENT DOCUMENTS

| | | |
|---|---|---|
| JP | 2-300081 | 12/1990 |
| JP | 5-178561 | 7/1993 |
| JP | 2001-114484 | 4/2001 |
| JP | 2003-112875 | 4/2003 |
| WO | WO 2004/050526 | 6/2004 |
| WO | WO 2009/034224 | 3/2009 |

* cited by examiner

METHOD FOR INSTALLING THE HOISTING ROPING OF AN ELEVATOR

CROSS-REFERENCE TO RELATED APPLICATIONS

This is a Continuation of PCT/FI2010/000029 filed on May 3, 2010 which is an International Application claiming priority from FI 20090213 filed on May 28, 2009, the entire contents of which are hereby incorporated by reference.

BACKGROUND

Example embodiments relate more particularly to the installation of the hoisting ropes of elevators with high travel heights, i.e. of high-rise or mega high-rise elevators. Example embodiments may be well suited to elevators with a suspension ratio of 1:1, but it can be used just as well also in other types of elevators.

Elevators of high travel heights contain long and heavy hoisting ropes. This can cause problems when hoisting ropes are installed. One method for installing hoisting ropes is to lift rope reels into the top part of the elevator hoistway with some hoisting device suited to the purpose, after which rope is started to be discharged from the reels and lowered downwards. A problem in this solution is first lifting heavy rope reels to the top part of a high elevator hoistway. Another problem is that lowering long and heavy ropes down is difficult to control and this requires hoisting machine with a high rated load. The farther down the ropes are to be lowered, the more their weight will acts on the hoisting machine lowering the rope. If lowering downwards does not succeed, the ropes can start to fall downwards at high speed, which can cause dangerous situations and/or break structures.

Another method is to lift the ropes from reels in the bottom part of the hoistway to the top part of the hoistway by pulling the ropes upwards from the ends of the ropes e.g. by means of some type of hoist. In this solution a problem can be formed by the properties required for the hoist used to lift the ropes, because the hoisting height or hoisting power of small hoists is not necessarily sufficient for lifting long and heavy ropes up. The hoist must be able to lift also the weight of its own hoisting chain or hoisting rope in addition to the weight of the hoisting ropes. Thus it may be necessary to use a special hoist with a large rated load and hoisting height for lifting the ropes, which incurs extra costs.

In the aforementioned prior-art solutions a problem can still be that installation of the ropes takes a lot of time and a number of employees are needed for it, which incurs extra costs. In addition, one problem in these solutions is that the hoisting ropes can generally be installed only in the final stage of the construction project, and starting and implementing installation of the ropes only after the structures of the hoistway are completed significantly delays completion of the elevator. Additionally, if problems arise in the installation of the ropes, they are only noticed in a late stage and the whole project can be delayed owing to this. Furthermore, with this type of installation the installation time is generally designed to be short, which causes hurry and stress in the final stage of the installation, in which case also additional careless errors and dangerous situations can occur due to the hurry and stress.

SUMMARY

Example embodiments are to eliminate the aforementioned drawbacks and to achieve a simple and low-cost method for installing the hoisting roping of an elevator, which method is particularly well suited to elevators with high travel heights.

Some inventive example embodiments are also discussed in the descriptive section of the present application. The inventive content of example embodiments can also be defined differently than in the claims presented below. The inventive content of example embodiments may also consist of several separate inventions, especially if example embodiments are considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each example embodiment can also be applied in other example embodiments. In addition it can be stated that at least some of the subordinate claims can in at least some situations be deemed to be inventive in their own right.

The aim of example embodiments is to eliminate the aforementioned drawbacks, among others, of prior-art solutions. More particularly the aim of the invention is to produce a more efficient method for roping an elevator. The aim of the invention is further to produce one or more of the following advantages, among others:

- Installation of the elevator is quicker than with prior-art methods.
- Since installation of the ropes progresses along with completion of the other parts of the elevator, installation of the ropes does not remain in its entirety until the final phase of the construction project and thus does not delay completion of the project.
- Installation of the ropes does not need to be done in a hurry under pressure in the final phase of the construction project, owing to which the installation can be done more carefully, in which case possible errors and dangerous situations caused by hurry and stress are avoided.
- Only one employee is needed for most of the installation work, which saves costs.
- The installation work is not physically hard for the fitter.
- A special hoist, which has a large hoisting height (lifting distance) and/or hoisting capacity, is not needed for installing the ropes.
- The method is simple and inexpensive.

According to example embodiments, in the method for installing the hoisting roping of an elevator, the hoisting roping of the elevator is lifted upwards into the elevator hoistway by means of a hoisting device. The hoisting roping is lifted upwards into the elevator hoistway in steps such that a) at least one rope of the roping is lifted by pulling it to the height (h1) and the aforementioned at least one rope is fixed to the elevator hoistway or to another fixed structure of the building, b) at least one of the ropes of the roping that is at the height (h1) and was lifted in phase a) is detached, c) at least one rope detached in phase b) is lifted by pulling it to the next height (h2) and the aforementioned at least one rope is fixed to the elevator hoistway or to another fixed structure of the building, preferably so that the aforementioned at least one rope is fixed in the proximity of its end.

This type of stepped lift produces a number of advantages and also enables different operating alternatives. The number of ropes to be lifted at one time can, among other things, be reduced. Likewise, one advantage is that the steps can be fitted with the progress of some other elevator structure so that the aforementioned other elevator structure progresses at essentially the same pace from the bottom to the top as the lifting of the ropes. Similarly, lifting in steps can be performed more safely in the method because guiding the ropes on the desired path of movement during one long lift is more awkward. Likewise, it can be easier to influence the power requirements/overload state of the hoisting device.

In one example embodiment in the phase a) the first number (n1) of ropes of the roping are lifted simultaneously with each other and in the phase c) the second number (n2) of ropes of the roping (6) are lifted simultaneously with each other, which second number (n2) is preferably smaller than (but could also be equal to) the first number (n1), and the number of ropes to be lifted at one time is 1, 2, 3, 4, 5, 6, 7 or more. Reducing the number of ropes to be lifted at one time enables the use of hoisting devices of weaker hoisting capacity, because when the step to be lifted is high the mass of the ropes is considerable and is greater the higher the rope/ropes extend.

In one example embodiment, the hoisting device is lifted upwards when the fixing height of the ropes reaches the proximity of the hoisting device.

In one example embodiment, a rope of the roping is lifted by pulling it upwards from near the end of the rope, and the end of the rope is fixed to the elevator hoistway or to another fixed structure of the building at the next lifting height, preferably to a separate and temporary rope fixing beam.

In one example embodiment, the phases a)-c) are repeated until the desired height is reached.

In one example embodiment, the ropes of the roping are lifted with the hoisting device in the elevator hoistway one or more ropes at a time to the lifting height (h1) and the ends of the ropes are fixed into their position, after which the hoisting device is moved if necessary upwards in the elevator hoistway, after which the ropes of the roping are detached from their fixing at the height (h1) and are lifted with the hoisting device in the elevator hoistway one or more ropes at a time to the next lifting height (h2), and the lifting, fixing and detaching of the ropes is continued until the desired height is reached. One advantage is that a shorter hoisting height/lifting distance than before is required of the hoisting device.

In one, example embodiment, the ropes of the roping are lifted in steps as the installation of the elevator hoistway, of the guide rails of the elevator car and of the guide rails of the counterweight progresses, and after the lift the ends of the ropes to be lifted are fixed to the elevator hoistway or to another fixed structure of the building using a working platform that moves in the vertical direction in the elevator hoistway as an aid.

In one example embodiment, in the method the temporary machine room platform is moved in steps by jump-lifts upwards in the elevator hoistway, and in connection with each jump-lift the ropes of the roping are lifted by a distance essentially the length of the jump-lift upwards in the elevator hoistway and fixed after the lift to the elevator hoistway or other fixed structure of the building for the time between jump-lifts. Thus, the lifting of the ropes progresses substantially at the same rate as the increase of the elevator lifting height.

In one example embodiment, the guide rails of the elevator car and the guide rails of the counterweight are installed in the elevator hoistway by putting guide rail sections consecutively end-to-end, and when a certain amount of guide rail sections are installed end-to-end the hoisting ropes of the roping are lifted with the hoisting device one or more ropes at a time upwards in the elevator hoistway by the distance of the length of the aforementioned certain amount of guide rail sections and fixed after the lift to the elevator hoistway or other fixed structure of the building for the time between lifts. Thus, the lifting of the ropes progresses substantially at the same rate as the installation work of the elevator lifting height. Thus, the working height in the shaft can be kept short and the movement of fitters up and down can be decreased.

In one example embodiment, the ends of the ropes of the roping are fixed in their topmost height position to the elevator hoistway or to another fixed structure of the building essentially before the elevator hoistway is fully completed.

BRIEF DESCRIPTION OF THE DRAWINGS

In the following, example embodiments will be described in detail by the aid of one example of its embodiment with reference to the attached drawings, wherein.

DETAILED DESCRIPTION OF EXAMPLE EMBODIMENTS

Figure 1:
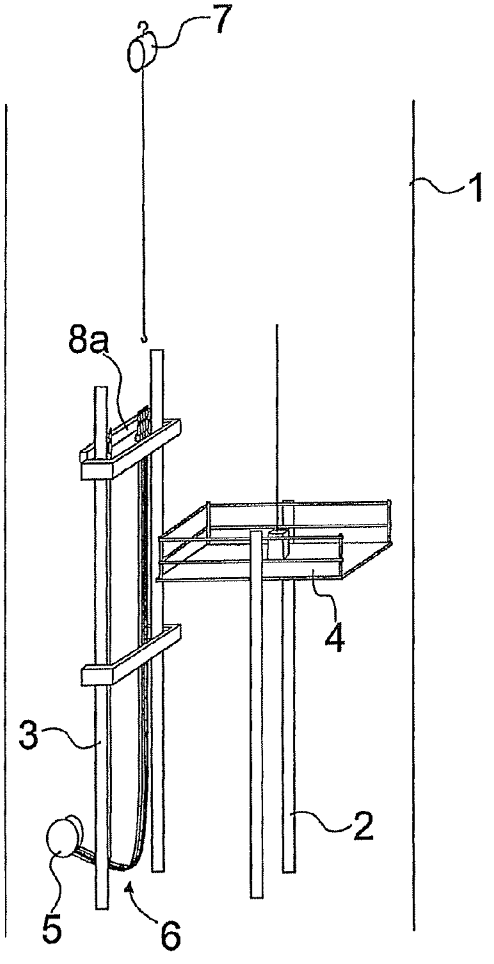
FIG. 1 presents an oblique side view of an elevator hoistway in the initial stage of its installation and of an initial phase of one method according example embodiments.

FIG. 1 presents an oblique side view of an elevator hoistway in the initial stage of its installation. The elevator hoistway 1 is built from the bottom upwards. In this phase the elevator hoistway 1 is built a little distance from the bottom upwards and the lowermost parts of the guide rails 2 of the elevator car as well as of the guide rails 3 of the counterweight are erected into position. A working platform 4 is fitted to the guide rails of the elevator car, from which platform the fitter or fitters build the elevator upwards. The final hoisting roping 6 that is on the reel or reels 5 is brought close to the bottom part of the hoistway, from where the ropes 6 are lifted with the hoisting device 7 a distance roughly the length of the guide rails 3 upwards to the first lifting height hl and the ropes are fixed temporarily to the first temporary fixing beam 8*a* of the ropes that is fixed to the guide rails 3 of the counterweight, which fixing beam is supported e.g. on one fixing means 3*a* of the guide rails 3. In this example case the hoisting roping 6 comprises four hoisting ropes and the hoisting device 7 is a chain hoist, which is fixed to the structures of the building. In the initial phase of installation, when the height is not yet very great, all the ropes of the hoisting roping 6 can be lifted simultaneously because their weight is not yet very large. In later phases the number n1, n2 of the ropes to be lifted at one time must generally be reduced. The number n1, n2 can be e.g. 1, 2, 3 or more ropes at one time.

Figure 2:
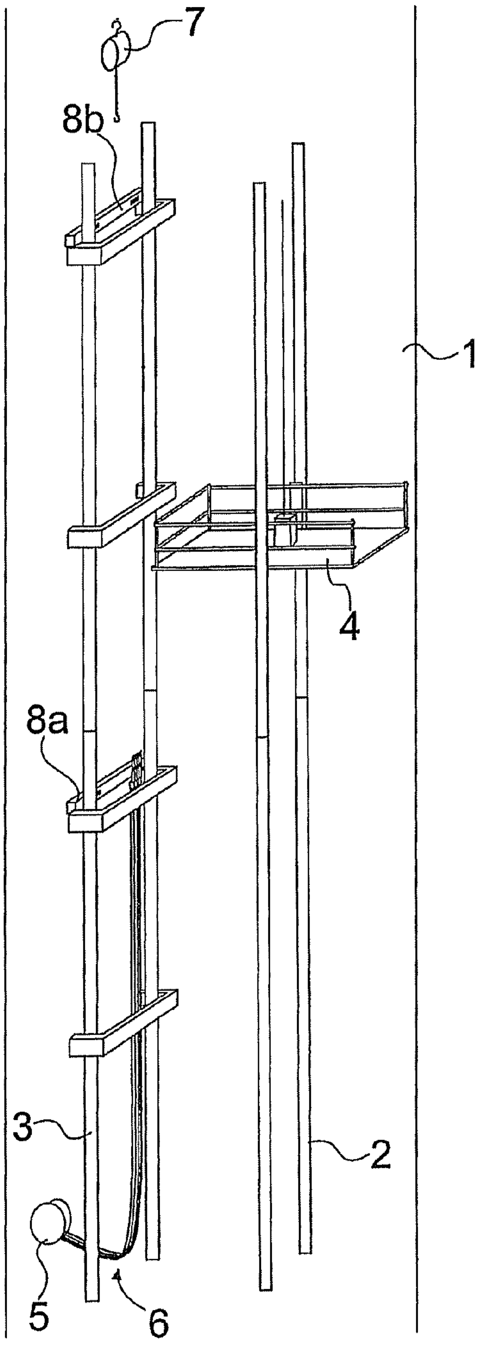
FIG. 2 presents a second phase of one method according to example embodiments.

In FIG. 2 the guide rails 2 of the car and the guide rails 3 of the counterweight have been extended higher. The second temporary fixing beam 8*b* of the ropes is fixed to the top part of the guide rails 3 of the counterweight at the next lifting height h2, which fixing beam is also supported on one fixing means 3*a* of the guide rails, to which second fixing beam 8*b* of the ropes the hoisting roping 6 is intended to be fixed next. The hoist 7 is also lifted upwards in the elevator hoistway 1 and the hoist 7 is again fixed to the structures of the building, e.g. to support structures fixed to the elevator hoistway.

Figure 3:
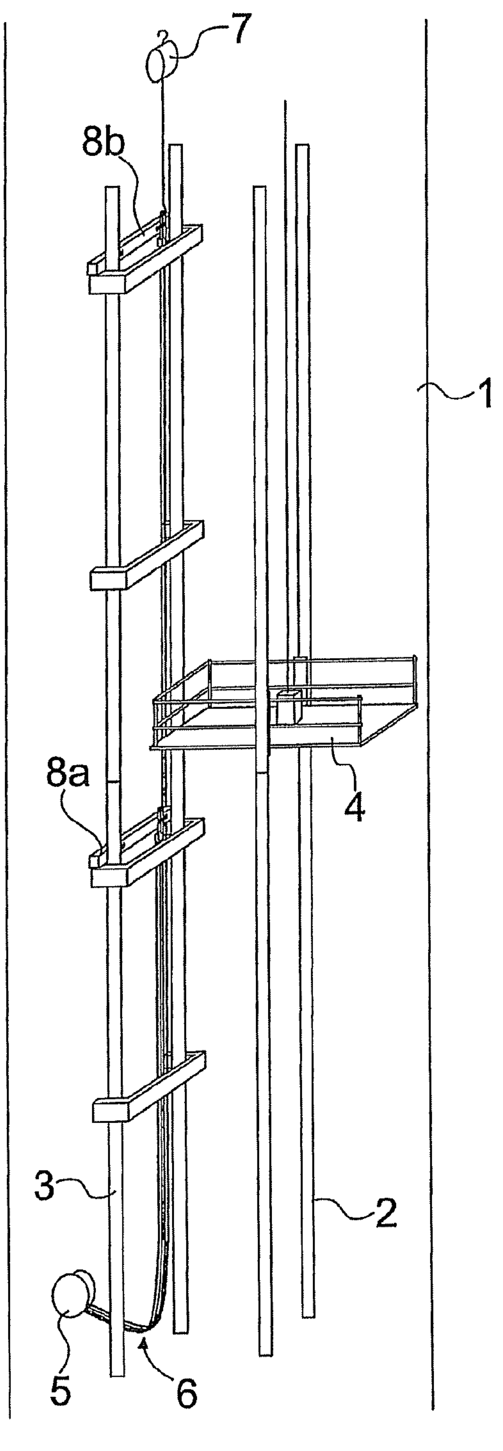
FIG. 3 presents a third phase of one method according to example embodiments.

In FIG. 3, two of the ropes of the hoisting roping 6 are lifted by means of the hoist 7 to the second fixing beam 8*b* of the ropes. Before the lifting the fitter has detached the ropes to be lifted from the first fixing beam 8*a* of the ropes and fixed the ropes to the lifting hook of the hoist 7 from the working platform 4, and also during the lift guided the lifting of the ropes from the working platform.

Figure 4:
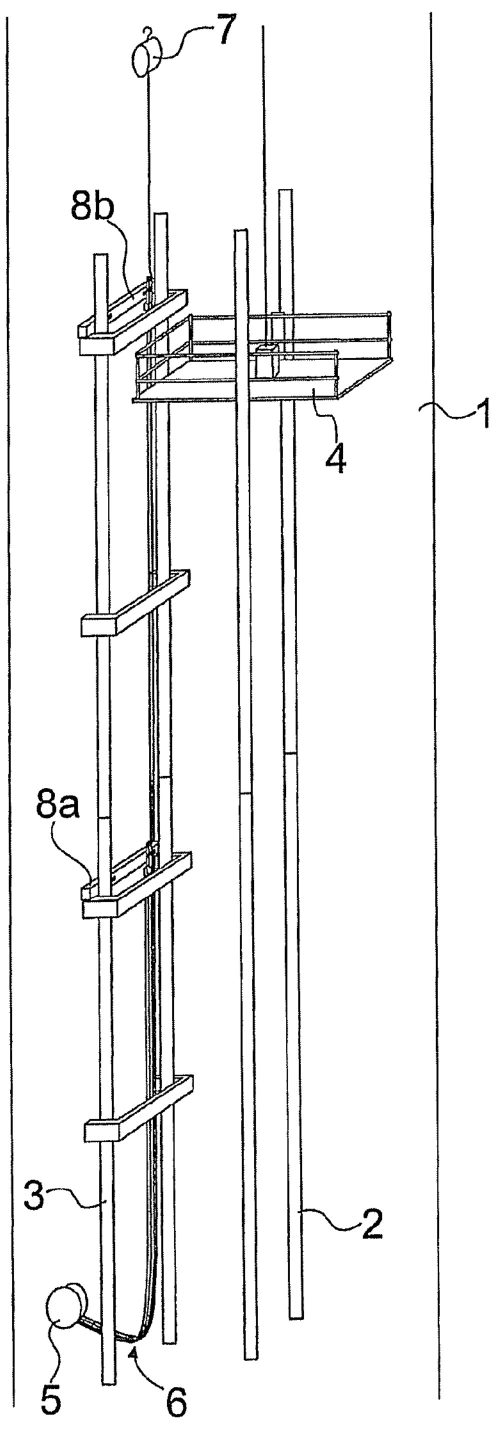
FIG. 4 presents a fourth phase of one method according to example embodiments.

In FIG. 4 the fitter has ascended on the working platform 4 essentially to the level of the second fixing beam 8*b* of the ropes at the same time guiding the lifting of the ropes, after which the fitter has fixed two ropes lifted to this level near their ends to the second fixing beam 8*b* of the ropes.

Figure 5:
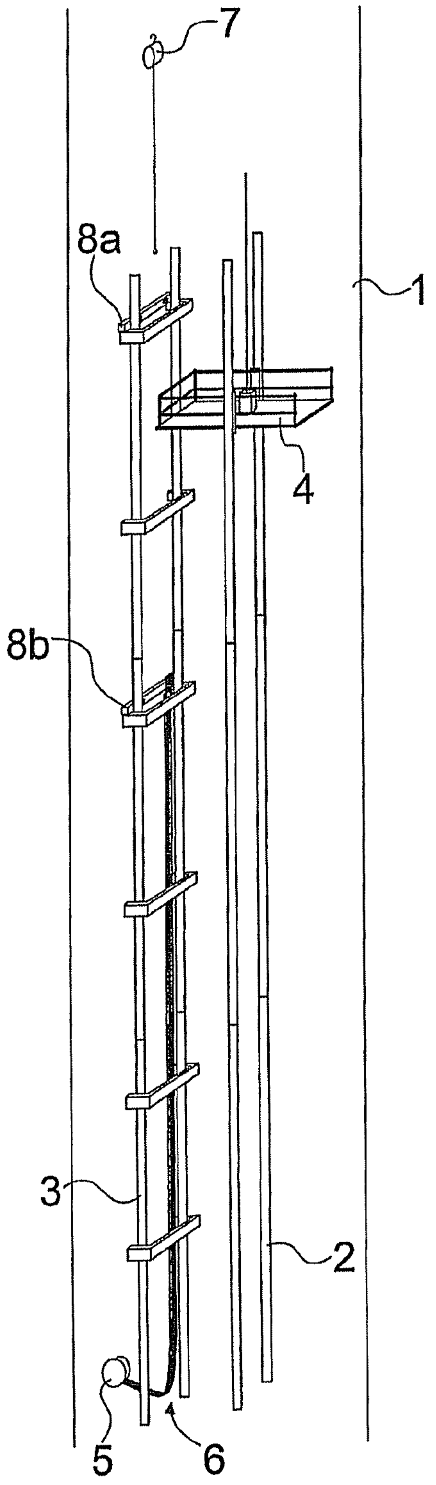
FIG. 5 presents a fifth phase of one method according to example embodiments.

In FIG. 5 the guide rails 2 and 3 have again been extended to be higher. Also the remaining two ropes of the hoisting roping 6 have been lifted to the level of the second fixing beam 8*b* of the ropes and fixed to the second fixing beam 8*b* of the ropes. Now, when all the ropes of the hoisting roping 6 are fixed to the second fixing beam 8*b* of the ropes, the first fixing beam 8*a* of the ropes is detached and fixed to the higher guide rails 3 of the counterweight to await the next lifting phase of the hoisting roping 6. The hoist 7 is also again lifted upwards in the hoistway and it is fixed to the structures of the building.

Figure 6:
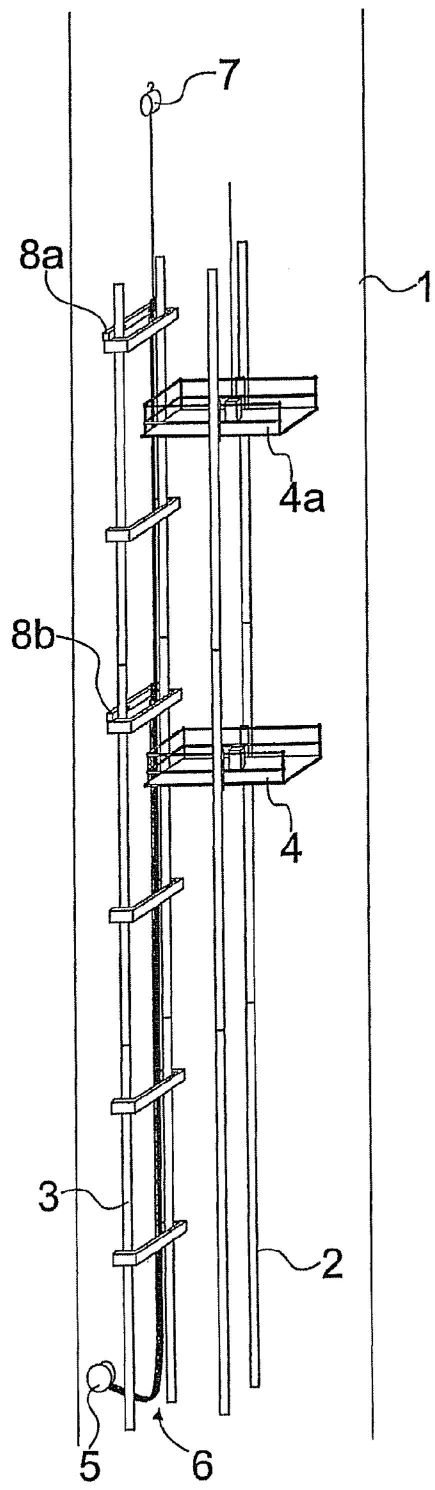
FIG. 6 presents a sixth phase of one method according to example embodiments.

In FIG. 6, two of the ropes of the hoisting roping 6 are again detached from the second fixing beam 8*b* of the ropes and lifted by means of the hoist 7 higher now than the second fixing beam 8*b* of the ropes to the level of the fixed first fixing beam 8*a* of the ropes. Next these two hoisting ropes are fixed to the first fixing beam 8*a* of the ropes and the remaining two hoisting ropes are lifted to this level and fixed to the first fixing beam 8*a* of the ropes. In this phase also a second working platform 4*a* is additionally fitted to the guide rails 2 of the elevator car, so that installation work could be performed at the same time at different heights and thus save time.

After this the hoisting roping 6 is lifted in phases upwards in the same way as described above as more floors for the building are completed. If the building is tall, in the final phase possibly only one rope of the hoisting roping 6 is lifted at one time with the lifting device, because the ropes weigh more the higher they rise. When the hoisting roping 6 has been lifted up, it is fixed, e.g. to some temporary fixing point until everything else is finished so that the hoisting roping can be guided over the traction sheave of the elevator machine and fixed to both the car sling and the counterweight. This invention relates primarily to lifting the hoisting roping 6 upwards, so that the procedures subsequent to it can be performed e.g. with prior-art installation methods.

With the method according to the invention the hoisting roping 6 of an elevator is thus installed by lifting the hoisting ropes into the elevator hoistway in steps phase-by-phase as the rest of the installation of the elevator progresses, in which case the hoisting ropes are lifted upwards along with the rise of another structure of the elevator. In this case the hoisting roping 6 is installed e.g. as follows. The lowermost parts of the guide rails 2 of the elevator car and of the guide rails 3 of the counterweight are erected on the base of the elevator hoistway 1 and a working platform 4 is fitted to the guide rails 2 of the car. The hoisting roping 6 on at least one reel 5 is brought to the proximity of the bottom part of the elevator hoistway 1 and protected from dampness. A first fixing beam 8*a* of the ropes is fixed to the guide rails 3 of the counterweight, near the top end of their completed section, e.g. to be supported by the fixing means 3*a* of the guide rails 3. After this the ends of the ropes of the hoisting roping 6 are lifted simultaneously to the level of the beam 8*a* by means of the hoist 7 and the ropes are fixed near their top ends to the first fixing beam 8*a* of the ropes. The ropes are lifted either all at the same time, some of the ropes at the same time or only one rope at a time, depending on how high they are.

Next the guide rails 2 of the elevator car and the guide rails 3 of the counterweight are extended to be higher and a second fixing beam 8*b* of the ropes is fixed near the new top ends of the guide rails 3 of the counterweight. If the ends of the hoisting ropes are already lifted close to the height at which the hoist 7 is, the hoist 7 is moved upwards. Next the ropes of the hoisting roping 6 are detached from the first fixing beam 8*a* of the ropes and lifted by means of the hoist 7 to essentially the level of the second fixing beam 8*b* of the ropes and fixed to the second fixing beam 8*b* of the ropes. The ropes are lifted either all at the same time, some of the ropes at the same time or only one rope at a time, depending on how high they are.

After this the guide rails 2 and 3 are again extended to be higher and the first fixing beam 8*a* of the ropes is moved close to the new top ends of the guide rails 3 of the counterweight and supported on the guide rails 3 of the counterweight. The hoist 7 is again lifted upwards, the hoisting ropes are detached from the second fixing beam 8*b* of the ropes and lifted by means of the hoist 7 to the level of the first fixing beam 8*a* of the ropes and fixed to it. The number of ropes to be lifted at the same time depends again on what height has been reached. This is continued until the hoisting roping 6 is lifted to the desired height. After this e.g. prior-art installation methods are used, by means of which the hoisting ropes are guided over the traction sheave of the elevator machine and fixed to the car sling and to the counterweight.

The preceding is an installation method described earlier, which is suited to any elevator whatsoever and the stepped lifts of the ropes are performed e.g. according to the steps of the rise of the guide rails. The installation method according to the invention described earlier can also be used such that the stepped lifting of the ropes is performed according to the progress of some other structure of the elevator, preferably in connection with the use of the so-called jump-lift installation method. In this case according to the method the temporary machine room platform is moved in steps, i.e. in jump-lifts, upwards in the elevator hoistway (which temporary machine room is a platform located above the elevator car and meant for supporting the elevator car and the hoisting machine for hoisting the elevator car during construction time use). The final hoisting ropes of the elevator are lifted in connection with each lift of the machine room platform, i.e. jump-lift, essentially the distance of the length of the jump-lift upwards in the elevator hoistway and fixed immovably into position in some suitable location, e.g. to the elevator hoistway or to a support structure supported on another part of the building, e.g. a temporary fixing beam in the elevator hoistway or a temporary machine room platform. The hoisting ropes are in this case temporarily fixed for the time between jump-lifts. The lifting of the ropes in steps is performed in connection with jump-lifts, i.e. it can be done between jump-lifts, before a jump-lift or after a jump-lift, or simultaneously with a jump-lift. If the lifting of the ropes (phases a-c) is performed before or after a jump-lift, it is possible to work in peace because the elevator car below the machine room platform can serve passengers during the lifting of the ropes. The jump can be otherwise carried out in a known manner, e.g. in a manner as disclosed in European patent EP1583710B1.

In the method the rope/ropes 6 are fixed preferably near their ends, preferably on the support structures of the car guide rails or counterweight guide rails or on structures supported by a support structure, e.g. a fixing beam 8*a*, 8*b*. In this application, near their ends means the end of the rope or the section of rope in the immediate proximity of the end.

The hoisting device 7 is in the method most preferably a hoisting device that during the lifting of the ropes has the primary, and preferably only, task of lifting the ropes. Most preferably the hoisting device 7 does not simultaneously lift platforms, the car or some other heavy structure of the elevator simultaneously with lifting the ropes. The hoisting device is preferably a Tirak hoist or other corresponding auxiliary hoist. The hoisting roping 6 to be installed is most preferably in all embodiments the final hoisting roping of the elevator, which in the method is later arranged to move the elevator car and possibly a counterweight when moved by the final hoisting machine of the elevator. In the invention the fixing of a rope can be performed e.g. by supporting the rope directly or indirectly on some fixed structure of the elevator hoistway or of the building so that the rope is not able to fall downwards into the elevator hoistway.

It is obvious to the person skilled in the art that different embodiments of the invention are not limited to the example described above, but that they may be varied within the scope of the claims presented below. Thus, for example, the method can be used for installing the hoisting ropes of an elevator of a different type than what is described above. In this case the suspension ratio can be other than 1:1, e.g. 1:2, 1:4, etc.

It is also obvious to the skilled person that the hoisting roping can comprise a different amount of hoisting ropes than four, such as e.g. six or eight.

It is further obvious to the person skilled in the art that the hoisting ropes can between lifts be fixed to another location than to a beam fixed to the guide rails of the counterweight. The ropes can be fixed e.g. to a temporary fixing point on the wall of the elevator hoistway.

The invention claimed is:

1. A method for installing hoisting ropes of an elevator, comprising:

lifting upwards the hoisting ropes of the elevator into an elevator hoistway via a hoisting device, wherein:

in phase a), at least one rope of the hoisting ropes is lifted by pulling the rope to a set height and the at least one rope is fixed to the elevator hoistway or to another fixed structure of a building, in phase b), the at least one of the hoisting ropes that is at the set height and was lifted in phase a) is detached, and in phase c), the at least one rope detached in phase b) is lifted by pulling the rope to a next height and the at least one rope is fixed to the elevator hoistway or to another fixed structure of the building, whereby in phase a), the first number of ropes of the roping is lifted simultaneously with each other, and in phase c) the second number of ropes of the roping is lifted simultaneously with each other, in which the second number of ropes is smaller than the first number of ropes, and in that the number of ropes to be lifted at one time is 1, 2, 3 or more.

2. The method according to claim 1, wherein the hoisting device is lifted upwards when the fixing height of the ropes reaches near the hoisting device.

3. The method according to claim 1, wherein a rope of the hoisting roping is lifted by pulling the rope upwards from at least near an end of the rope, whereby the end of the rope is fixed to the elevator hoistway or to another fixed structure of the building at the next lifting height.

4. The method according to claim 1, wherein the phases a) -c) are repeated until a desired height is reached.

5. The method according to claim 1, wherein the hoisting ropes are lifted with the hoisting device in the elevator hoistway one or more ropes at a time to a lifting height and the ends of the ropes are fixed into their position, after which the hoisting device is moved if necessary upwards in the elevator hoistway, after which the ropes of the roping are detached from their fixing at the height and are lifted with the hoisting device in the elevator hoistway one or more ropes at a time to the next lifting height, and in that the lifting, fixing and detaching of the ropes is continued until the desired height is reached.

6. The method according to claim 1, wherein when the hoisting ropes are lifted during installation of the elevator hoistway, guide rails of an elevator car, and guide rails of a counterweight progresses, the ends of the ropes to be lifted are fixed to the elevator hoistway or to another fixed structure of the building using a working platform that moves in a vertical direction in the elevator hoistway as an aid.

7. The method according to claim 1, wherein a temporary machine room platform is moved during jump-lifts of upward movement in the elevator hoistway, and in that in connection with each jump-lift, the hoisting ropes are lifted by a distance corresponding to a length of the jump-lift upwards in the elevator hoistway and fixed after the lift to the elevator hoistway or other fixed structure of the building during the time between jump-lifts.

8. The method according to claim 1, wherein guide rails of an elevator car and guide rails of a counterweight are installed in the elevator hoistway by putting guide rail sections consecutively end-to-end, and when a certain amount of guide rail sections are installed end-to-end, the hoisting ropes are lifted with the hoisting device one or more ropes at a time upwards in the elevator hoistway by a distance of the certain amount of guide rail sections and after the lift fixed to the elevator hoistway or other fixed structure of the building during the time between lifts.

9. The method according to claim 1, wherein the ends of the hoisting ropes are fixed in topmost height positions to the elevator hoistway or to another fixed structure of the building before the elevator hoistway is fully completed.

* * * * *